(12) United States Patent
Ogawa

(10) Patent No.: US 6,192,366 B1
(45) Date of Patent: Feb. 20, 2001

(54) INTEGRATED DATABASE SYSTEM AND COMPUTER-READABLE RECORDING MEDIUM RECORDED WITH PROGRAM FOR MANAGING DATABASE STRUCTURE THEREOF

(76) Inventor: Atsuro Ogawa, 5-11-6, Kanayama, Naka-ku, Nagoya, Aichi, 460-0022 (JP)

(*) Notice: Under 35 U.S.C. 154(b), the term of this patent shall be extended for 0 days.

(21) Appl. No.: 09/025,847

(22) Filed: Feb. 19, 1998

(30) Foreign Application Priority Data

Apr. 1, 1997 (JP) .................................................. 9-083043
May 29, 1997 (JP) .................................................. 9-139829

(51) Int. Cl.[7] .................................................. G06F 17/30
(52) U.S. Cl. .............................. 707/102; 707/4; 707/10; 707/100
(58) Field of Search .................................. 707/2, 3, 4, 10, 707/100, 101–104; 705/14, 16; 379/216, 218

(56) References Cited

U.S. PATENT DOCUMENTS

| | | | |
|---|---|---|---|
| 4,769,772 | * 9/1988 | Dwyer .................................. | 364/300 |
| 5,379,419 | * 1/1995 | Heffernan et al. .................... | 707/100 |
| 5,381,470 | * 1/1995 | Cambray et al. ..................... | 379/216 |
| 5,455,926 | * 10/1995 | Keele et al. ............................ | 711/4 |
| 5,581,756 | * 12/1996 | Nakabayashi ........................... | 707/2 |
| 5,603,025 | * 2/1997 | Tabb et al. .............................. | 707/2 |
| 5,729,730 | * 3/1998 | Wlaschin et al. ...................... | 707/3 |
| 5,758,337 | * 5/1998 | Hammond ............................... | 707/6 |
| 5,797,136 | * 8/1998 | Boyer et al. ............................ | 707/2 |
| 5,826,076 | * 10/1998 | Bradley et al. ......................... | 707/4 |
| 5,878,426 | * 3/1999 | Plasek et al. .......................... | 707/102 |
| 5,893,075 | * 4/1999 | Plainfield et al. ...................... | 705/4 |
| 5,893,087 | * 4/1999 | Wlaschin et al. ...................... | 707/3 |

FOREIGN PATENT DOCUMENTS

| | | |
|---|---|---|
| 0 490 465A2 | 6/1992 | (EP) . |
| 62-209615 | 9/1987 | (JP) . |
| 3-41532 | 2/1991 | (JP) . |

\* cited by examiner

*Primary Examiner*—Hosain T. Alam
*Assistant Examiner*—Shahid Alam
(74) *Attorney, Agent, or Firm*—Arent Fox Kintner Plotkin & Kahn, PLLC

(57) ABSTRACT

An integrated database system and a computer-readable recording medium recorded with a program for managing a database structure thereof which reduce work load and work cost by a relational database and a nonrelational database being integrated into a single system comprising storing means holding a database wherein a single record is made up of a record part of a relational database and a record part of a nonrelational database and the record part of the nonrelational database is made up of a parent record part only or a parent record part and at least one child record part linked to the parent record part and processing means for carrying out relational operation and data manipulation on the database.

8 Claims, 5 Drawing Sheets

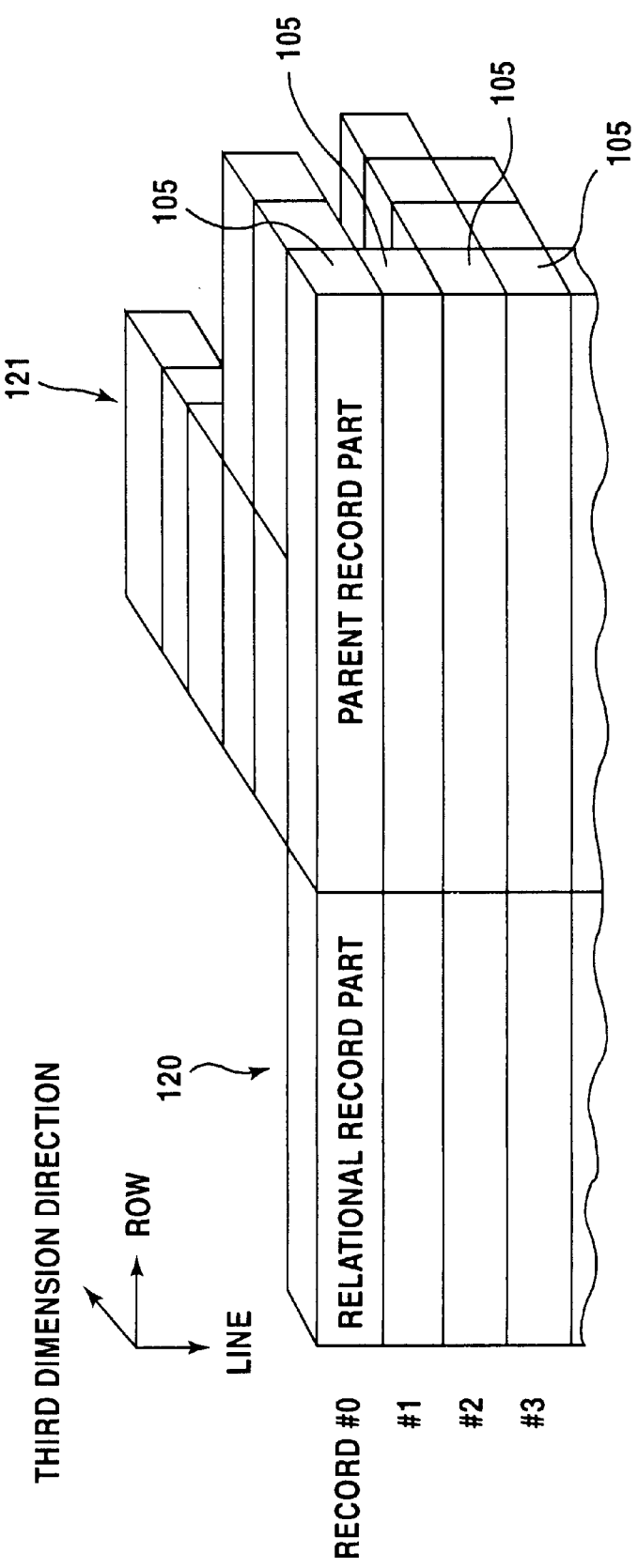

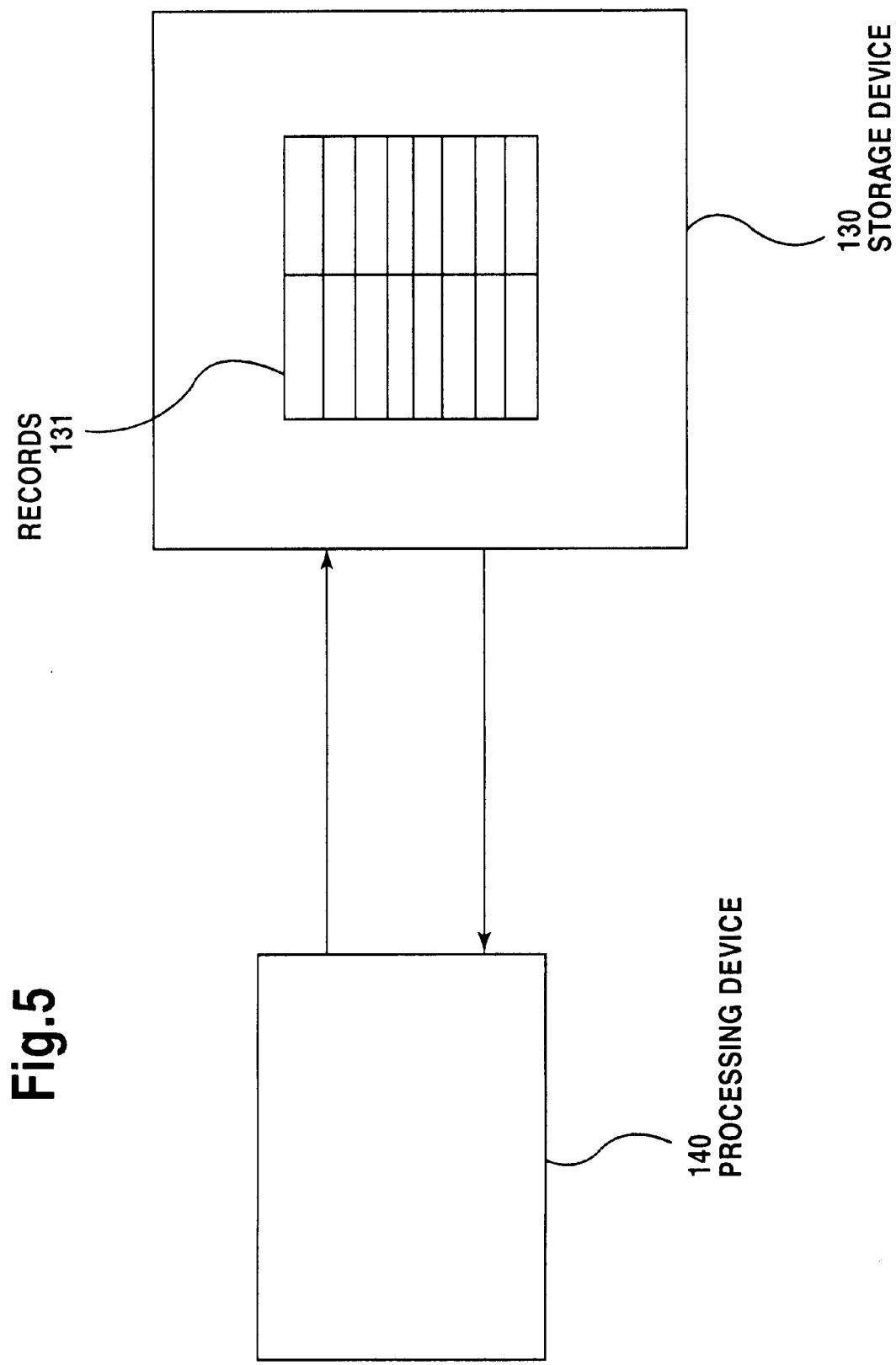

INTEGRATED DATABASE SYSTEM AND COMPUTER-READABLE RECORDING MEDIUM RECORDED WITH PROGRAM FOR MANAGING DATABASE STRUCTURE THEREOF

BACKGROUND OF THE INVENTION

This invention relates to a database wherein each record is made up of a record part of a relational database and a record part of a nonrelational database, and to a computer-readable recording medium recorded with a program for managing this database structure.

Conventionally, relational database systems and nonrelational database systems have been constructed as separate systems. Here, a relational database is a database made up only of data satisfying a normal form, and a nonrelational database is a database which is not limited to a normal form and is made up of either parent record parts only or parent record parts having one or more child record parts linked thereto. In systems having both a relational database system and a nonrelational database system of the configurations described above, data is converted in both directions between the relational database and the nonrelational database when data of the two systems is exchanged.

For example systems of financial institutions such as banks, life insurers, insurers and stockbrokerage companies have an off-line system using a relational database system and an on-line system using a nonrelational database system. In the on-line system, for example payment and receipt transactions inputted from terminals at branches are transmitted to a central facility and on the basis of these transactions data manipulation such as reference to and updating of the nonrelational database is carried out. The off-line system is operated for example from when the on-line business finishes, and on-line data is converted into off-line data to incorporate log information accumulated in the on-line system into the off-line relational database. Then, by performing relational operation and data manipulation processing on the off-line relational database, for example daily and monthly various statistical tables and documents are outputted and distributed to branches and return of information is thereby carried out. Also, by connecting this off-line relational database to a network, highly flexible non-fixed-form querying from branches and head office departments is made possible.

In a conventional normalized relational database, records are made up of relational lines only. That is, actual relational database systems have been developed with only the concept of 'relational line'='record'. Therefore, with respect to data for which this relational database structure is not ideal, for example in terms of processing efficiency or in terms of business processing, in practice inevitably a separate database system like the on-line system of a financial institution described above has had to be built and operated.

However, with the conventional configuration wherein a relational database and a nonrelational database are constructed as separate systems, because the database is made up of two systems there has been the problem that the work of development, operation and maintenance and the like is complex. Also, because costs of development, operation and maintenance and so on are duplicated, there has been the problem that the system is expensive.

In the financial institution system described above, great expenditure is required for the development of the on-line system and for the development of the off-line system. Also, the operating hours of the on-line system and the off-line system are different and there is the problem that because the off-line business is started after the on-line business ends the overall operating time of the financial institution system is long.

Also, sometimes, when data manipulation such as updating and deleting is to be carried out on a predetermined data set of a nonrelational database constructed as a separate system, a relational operation is carried out on the relational database system to extract a predetermined record set from the relational database and then a data set is extracted from the nonrelational database on the basis of for example matching of keys with the extracted relational database records and the data manipulation of updating and deleting or the like is then carried out on the data set thus extracted from the nonrelational database. In this case, both the relational database and the nonrelational database must be read. Because the relational database and the nonrelational database constructed as separate systems are held in physically or logically separate drives, in a database system using a virtual space system, when both databases are read, paging occurs. Consequently, when both databases are read, paging occurs frequently and the throughput of the system falls.

From the point of view of the reliability of the database system also, non-matching of data between the databases readily occurs, and because there is generally a time lag between the two systems such non-matching of data is liable to go unnoticed, and this causes serious problems in business execution.

A data system disclosed in Unexamined Published Japanese Application No. S.62-209615 uses a non-normal form relational system including repeat items, but this system still presupposes a relational database and does not have the object of integrating a relational database and a nonrelational database.

SUMMARY OF THE INVENTION

It is therefore an object of the present invention to provide an integrated database system and a computer-readable recording medium recorded with a program for managing the database structure thereof which reduce work load and work cost by integrating a relational database and a nonrelational database into a single system.

In an integrated database system and a computer-readable recording medium recorded with a program for managing the database structure thereof provided by the invention to achieve this object and other objects, each record is made up of a record part of a relational database and a record part of a nonrelational database, and relational operation and data manipulation are carried out on these records and as a result it is possible to provide a relational database and a nonrelational database as a single database. Therefore, the database system can be made a single system.

Also, the record part of the nonrelational database is made up of either a parent record part only or a parent record part and one or more child record parts linked to the parent record part. Therefore, in a database which for business processing reasons requires a parent record part and a child record part, it is not necessary to provide the two as separate tables.

In another integrated database system and computerreadable recording medium recorded with a program for managing the database structure thereof provided by the invention it is possible to process a relational operation on the record part of the relational database to extract a predetermined set of records and a data manipulation carried out on the extracted record set with a single command, and thus a relational operation and a data manipulation can be performed with a single reading.

With respect to data manipulation, raw data resulting from an execution in the nonrelational database part can be used in real time along with a relational database manipulation, and the reverse is also possible.

BRIEF DESCRIPTION OF THE DRAWINGS

FIG. 4 is a schematic view showing a database structure of the preferred embodiment; and FIG. 5 is a block diagram illustrating the interaction between a processing device and a storage device according to the present invention.

DETAILED DESCRIPTION OF THE PREFERRED EMBODIMENTS

A preferred embodiment of the invention will now be described with reference to the accompanying drawings.

A database system of a preferred embodiment of the invention is made up of a magnetic disc serving as storing means holding a database, a database management program serving as processing means loaded into real memory, and a CPU serving as a processing device for executing the database management program and so on. The database management program manages a database structure of this preferred embodiment which will be described below and carries out relational operation and data manipulation on the database.

Figure 1:
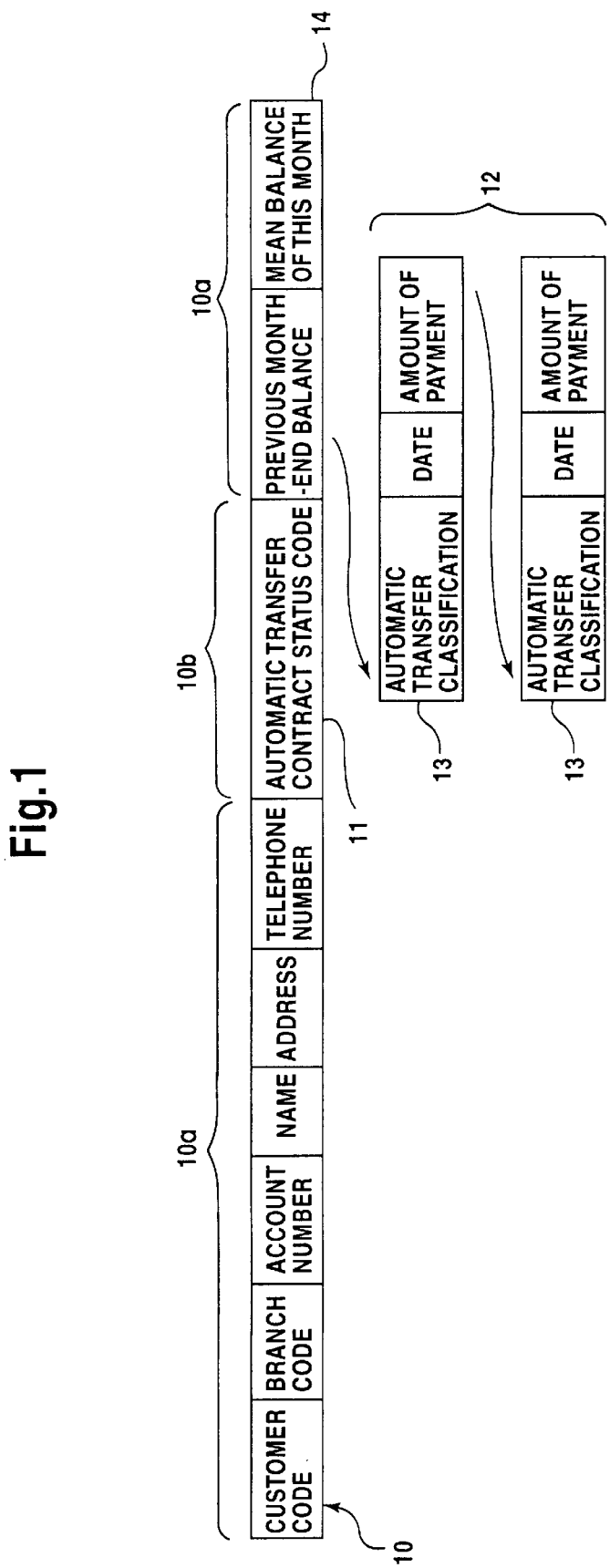
FIG. 1 is a view illustrating a record structure of a preferred embodiment of the invention.

A record of the database of this preferred embodiment is shown in FIG. 1. A single record 10 of this preferred embodiment is an example of a record configuration of the invention applied to for example a database of a banking system, and is made up of a record part of a relational database (hereinafter, 'record part of a relational database' will be abbreviated to 'relational record part') 10a and a record part of a nonrelational database (hereinafter, 'record part of a nonrelational database' will be abbreviated to 'nonrelational record part') 10b. The relational record part 10a shows customer information and the nonrelational record part 10b shows customer account information. The nonrelational record part 10b generally includes an account balance and a bankbook balance and so on, but for brevity the specific details thereof will not be described here.

The relational record part 10a is for example made up of fields for a customer code, a branch code, an account number, a name, an address, a telephone number, a previous month-end balance and a mean balance of this month.

The nonrelational record part 10b is made up of a parent record part 11 and a child record part 12. In the example shown in FIG. 1, the parent record part 11 is made up of a single parent record having a field for an automatic transfer contract status code, but it is of course also possible for the parent record part to be made up of a plurality of parent records. A pointer pointing to the first child record 13 of a plurality of child records 13 constituting the child record part 12 is held in the automatic transfer contract status code field. The child records 13 are each made up of data fields for an automatic transfer classification, a date and a payment amount, and a pointer field for pointing to the next child record 13. No particular limit is set on the number of child records 13 making up the child record part 12, and the child record part 12 as a whole is made of variable length.

The fields included in each of the child records 13 are in practice fields for a classification such as electricity, water, loan, check, bill and so on of an automatic transfer payment automatically debited from the account and for the date and the amount of each payment.

The fields of the relational record part 10a can become object fields of relational operations such as conditional searches and of data manipulations such as referencing, updating, inserting, and deleting. Here, by means of a relational operation such as a conditional search, in addition to extracting a specified record group from a single table, it is also possible to extract a specified record group from a plurality of tables. Data manipulation alone, not accompanying a relational operation, may be carried out on the nonrelational record part 10b, and also the fields of the parent record part thereof may be treated as object fields of a relational operation. Also, if a single child record 13 of the child record part 12 of the nonrelational record part 10b is specified and a single field is selected from among a plurality of fields of that child record 13, that selected field can be made an object of a relational operation.

The record 10 can also be thought of as being made up of a child record part 12 of variable length linked by pointers and a basic part 14 generally of a fixed length.

Figure 2:
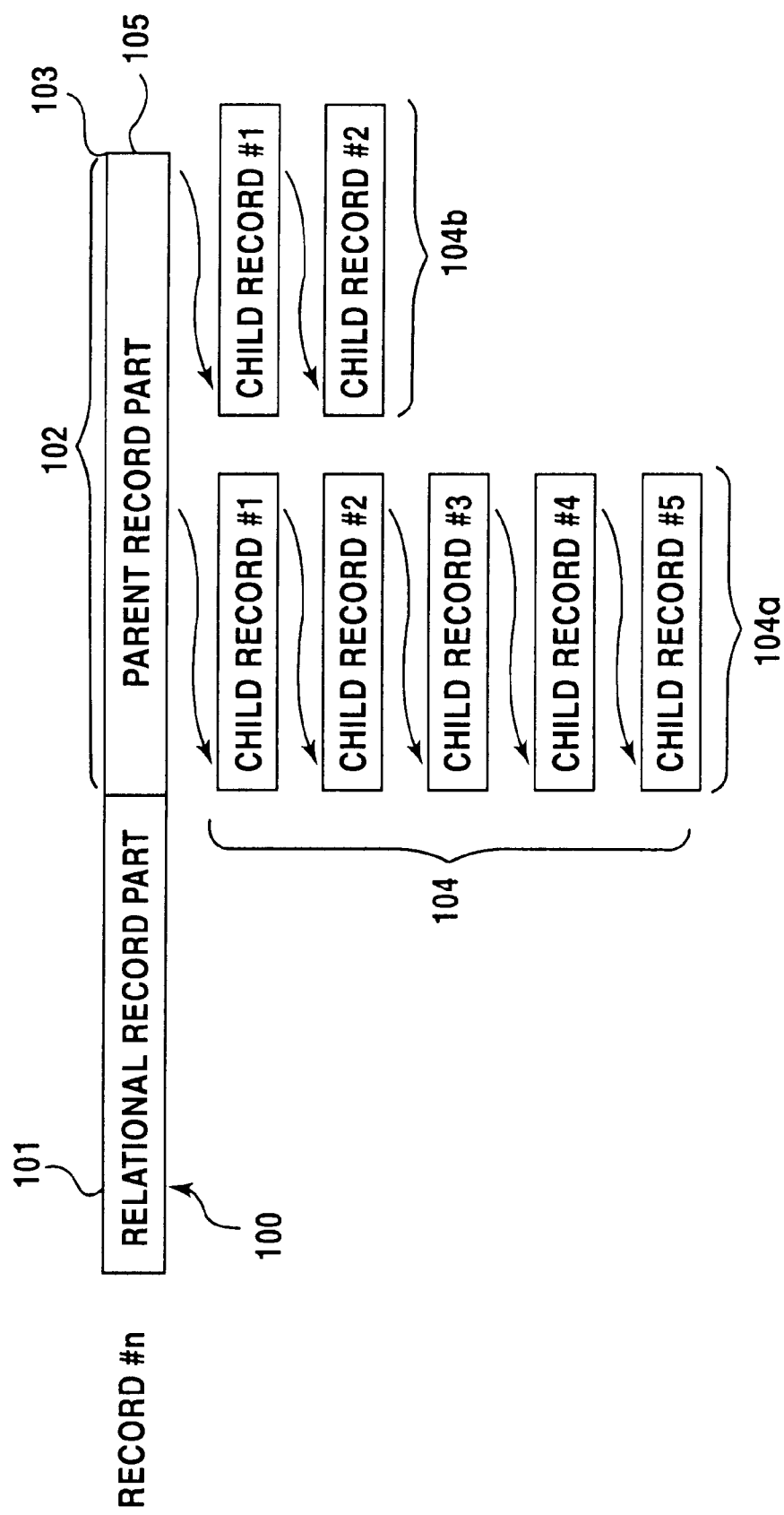
FIG. 2 is a schematic view showing the structure of a single record in the preferred embodiment.

The structure of a general record 100 of this preferred embodiment is shown schematically in FIG. 2. The record 100 is made up of a relational record part 101, a parent record part 103 of a nonrelational record part 102, and two child record parts 104a, 104b linked to the parent record part 103. The record 100 can also be thought of as a variable part 104 of variable length made up of child record parts 104a, 104b each of variable length and a basic part 105 of a fixed length. In FIG. 2, the relational record part 101 and the nonrelational record part 102 are each shown as making up an integrated field set in the basic part 105, but the fields making up the relational record part 101 and the nonrelational record part 102 may alternatively be out of order and mixed in the basic part 105.

The child record fields each have a pointer pointing to the next child record, and are linked in one direction. The pointer pointing to the next child record is made up of the page number of the page where the next child record is and for example the offset of the next child record in that page. The offset shows a position from the beginning of the page. An EOF (End of Field) marker is set in the pointer held in the field of the last child record of the child record part. In FIG. 2, two child record parts 104a, 104b are each linked to the parent record part 103, but alternatively the number of child record parts linked to the parent record part 103 may be zero. That is, the nonrelational record part 102 may be made up of the parent record part 103 only.

Figure 3:
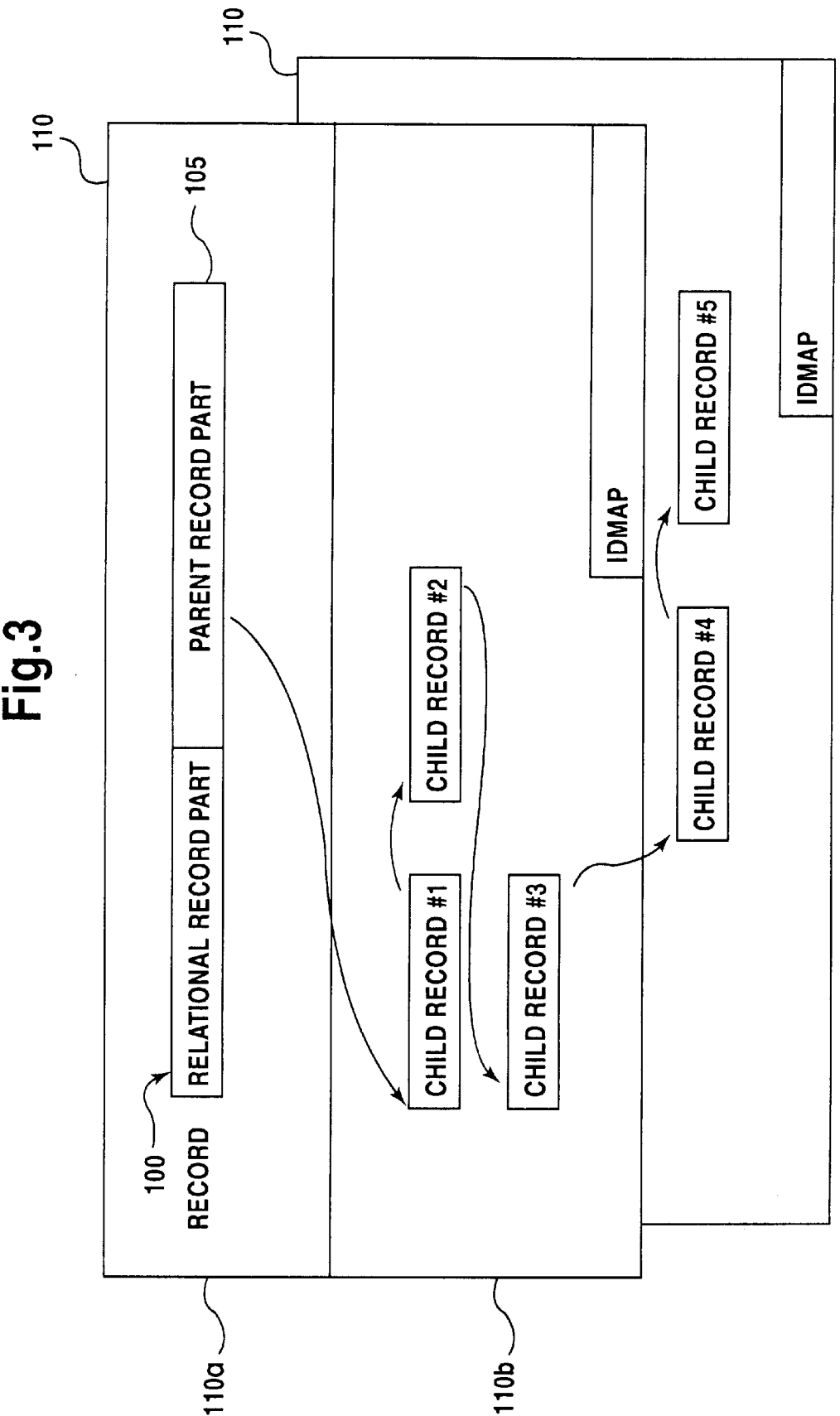
FIG. 3 is a view illustrating a linking structure of variable parts.

The location of the record 100 will now be explained using FIG. 3, taking the child record part 104a as an example. The basic part 105 of the record 100 is held in a basic area 110a of, a page 110, and the child record part of the record 100 is held in a free area 110b of the page 110. The pages 110 are delimited into for example 4K units. Although in FIG. 3 an example wherein the child record part spreads over a plurality of pages is shown, by the child records constituting the child record part being disposed close together it is possible for a single record 100 to be held in a single page. By this means it is possible to reduce the rate of incidence of paging.

An example of a database 120 of the present preferred embodiment made up of multiple records is shown in FIG. 4. Because as many variable parts 121 extending in a row direction and a line direction are generated as the necessary number of child records, the database 120 can be prevented from occupying unnecessary area. Also, since a two-dimensional table made up of basic parts 105 of a fixed length is normalized, the database 120 of this preferred embodiment shown in FIG. 4 made up of this normalized two-dimensional table and the variable parts 121 can be processed highly efficiently like a conventional normalized relational database. Furthermore, because in addition to the two-dimensional table made up of the basic parts 105 the database 120 has a variable number of child record groups formed in the direction of a third dimension by the variable parts 121, it is not necessary for the two-dimensional table part and the child record groups of variable number to be made separate tables. Therefore, the input-output load on the database is reduced.

Next, referencing and updating of the data in this preferred embodiment, and data manipulations consisting of the addition and deletion of child records and so on will now be described on the basis of FIG. 3.

(1) Referencing and Updating

1) Since each record has a unique record number (RID), using a specified RID the in-page offset of that record is obtained from the page ID maps by a known method and the record is found.

2) A target field is found from the in-record offset of that field, and the field type is compared with the data type of the actual data as a check. In the case of a child record, the target child record is found from the child record number by following the pointers.

3) In the case of referencing, data is read from the field or child record, and in the case of updating, data is written into the field or child record.

(2) Adding a Child Record

1) The page where an immediately preceding child record to which a new child record is to be connected lies is found and by a known method the map page is searched to check how much free space there is on that page. When there is no free space, a free space in the following page is found.

2) When a page having free space is found, the size of the free space and the size of the child record are compared and if necessary the page is condensed and if the addition can be made the in-page offset of the free space is obtained and for example the respective RID and in-page offset are set in the pointer of the above-mentioned immediately preceding child record. Then, the pointer value hitherto had by the immediately preceding child record is set in the pointer area of the child record being added and these are written into the free space and if necessary the page free space state shown by the map page is updated by a known method.

3) When the free space is smaller than the size of the child record even after the page is condensed, another page with free space is found from the map page.

(3) Deleting a Child Record

1) The page including the child record immediately preceding the child record to be deleted is found and in the pointer area of that child record is set the pointer value had by the child record to be deleted.

2) A deletion flag of the child record to be deleted is turned on. This child record is actually deleted when the page is next condensed.

3) After the deletion flag is turned on in 2), if necessary the page free space state shown by the map page is updated by a known method.

(4) Batch Manipulation of Child Records

The child records are connected by pointers and lie in nearby pages. Therefore, it is possible to refer to, update, add and delete a chain of child records efficiently in a batch. Batch manipulation is carried out by following the pointers and repeating the processes (1), (2) or (3) described above.

The extraction of data manipulation object records described above may be carried out using a designated RID or a predetermined record set may be extracted by performing a relational operation on the relational record part and then data manipulation carried out on at least either the relational record part or the nonrelational record part of the extracted record set. In this case, the relational operation and the data manipulation can be processed with a single command.

In the preferred embodiment of the present invention described above, by the relational record part 10*a* and the nonrelational record part 10*b* being made to constitute a single record 10, it is possible to provide an off-line system and an on-line system of a financial institution system as a single database system. Therefore, because development, operation and maintenance become those of a single system the work becomes easy and the work load is reduced. Also, the cost of development, operation and maintenance decreases.

Furthermore, with a single command it is possible to execute processing to carry out a relational operation on the relational record part 10*a* to extract a predetermined record set and perform a data manipulation on at least either the relational record part 10*a* or the nonrelational record part 10*b* of this extracted record set. As a result, the problem of paging occurring and processing efficiency consequently falling when a relational database and a nonrelational database are both referenced in a virtual space system because the two databases are constructed as separate systems does not arise.

Although in the preferred embodiment described above a single nonrelational record part 10*b* was combined with a single relational record part 10*a*, it is also possible to combine a plurality of nonrelational record parts with a single relational record part.

Also, in the preferred embodiment described above it is possible to make up the nonrelational record part 10*b* with parent record parts only. That is, it is possible to make up a nonrelational record part with parent record parts only which could not have existed in a conventional nonrelational database alone.

Also, when the fields inside each child record of the child record part are limited to a single data item only, a logical structure wherein non-normal-form repeated data elements of a relational database are disposed on a third dimension side is obtained. Therefore, because on the two-dimensional space side a normal form of a relational database can be secured, highly efficient handling becomes possible.

Also, in the preferred embodiment described above, because only the necessary number of child records are provided in the child record part, empty spaces are not formed in the database and the area occupied by the database can be reduced.

A database management program for managing a database structure of this invention can be provided recorded on a CD-ROM, FD, magnetic tape or other recording medium. It can also be provided over a network such as the Internet.

FIG. 5 illustrates the interconnection and relationship between a storage means or storage device and a processing means or processing device according to the present invention. Storage device 130 contains a plurality of records 131 therein. A single record of the plurality of records includes a record part of a relational database and a record part of a non-relational database, as discussed previously. Storage device 130 is connected to processing device 140, such that the processing device 140 can perform relational operations and data manipulation on records 131 of storage device 130. Records 131 are comparable to, for example, records 10 shown in FIG. 1, records 100 shown in FIG. 2, etc., in the configuration shown in FIG. 4.

With the present invention, because it is possible to provide a relational database and a nonrelational database as a single database, a database system can be integrated into a single system. Therefore, the work of developing, operating and maintaining the system becomes easy and the work load decreases. Furthermore, the cost of development, operation and maintenance of the system decreases.

Also, it is possible to enjoy a high processing efficiency obtained through the freedom of record structure allowed by a conventional nonrelational database without losing the degree of freedom of querying allowed by a normalized conventional relational database.

Furthermore, in this invention, raw data executed in the nonrelational database part can be connected to a relational database manipulation in real time and for example immediately reflected into a data manipulation such as a query. In this case also, the generally known effects of a normalized database can be fully obtained in the relational database part.

Also, because the nonrelational data and the relational data of a record can be checked against each other one record at a time, non-matching between the nonrelational data and the relational data does not readily occur. Furthermore, since duplicated data can be integrated, non-matching can be prevented.

Also, because in the present invention it is not necessary to put parent records and child records in different tables, the processing efficiency of data manipulation rises. That is, in the environment of a virtual space system, with respect to parts held in the same page the input-output load is reduced. Also, if a relational operation on a relational record part and data manipulation carried out on at least either a relational record part or a nonrelational record part are processed with a single command, since the number of readings of the database can be decreased and in a virtual space system the incidence of paging can be minimized, the throughput of the system can be increased. Also, because a child record part can be realized as a record part conceptually in a third dimension direction, it is possible to avoid user confusion in handling the data. It is notable in this connection that in relational databases expression on the basis of the concept of a two-dimensional table or combinations thereof is carried out commonly.

What is claimed is:

1. An integrated database system, comprising:
   a storage device containing database information thereupon, said storage device containing a plurality of records, wherein a single record of said plurality of records comprises a record part of a relational database and a record part of a non-relational database therein, wherein the record part of the non-relational database comprises at least a parent record part, said system further comprising
   a processing device connected to said storage device for performing relational operations and data manipulation on the plurality of records, wherein said processing device is configured to process a relational operation and a data manipulation with a single command, wherein said processing device performs a relational operation on the record part of the relational database to extract a predetermined set of records, and wherein said processing device performs data manipulation on the predetermined set of records.

2. An integrated database system as recited in claim 1, wherein said record part of said single record comprises the parent record part and at least one child record part linked to the parent record part.

3. An integrated database system, comprising:
   storage means containing database information thereupon, said storage means containing a plurality of records, wherein a single record of said plurality of records comprises a record part of a relational database and a record part of a non-relational database therein, wherein the record part of the non-relational database comprises at least a parent record part, said system further comprising
   processing means connected to said storage means for performing relational operations and data manipulation on the plurality of records, wherein said processing means is configured to process a relational operation and a data manipulation with a single command, wherein said processing means performs a relational operation on the record part of the relational database to extract a predetermined set of records, and wherein said processing means performs data manipulation on the predetermined set of records.

4. An integrated database system as recited in claim 3, wherein said record part of said single record comprises a parent record part and at least one child record part linked to the parent record part.

5. A computer-readable medium containing a computer program thereupon, said computer program configured to:
   perform a relational operation and a data manipulation on records of a database structure, wherein said records comprise a record part of a relational database and a record part of a non-relational database, wherein the record part of the non-relational database comprises at least a parent record part, wherein said program is configured to process a relational operation and a data manipulation with a single command, wherein said program performs a relational operation on the record part of the relational database to extract a predetermined set of records, and wherein the program performs data manipulation on the predetermined set of records.

6. A computer-readable medium according to claim 5, wherein said record part of said non-relational database comprises the parent record part and at least one child record part linked to the parent record part.

7. A method of manipulating an integrated database system, said method comprising the steps of:
   performing a relational operation and a data manipulation on records of a database structure, wherein a record of said records comprises a record part of a relational database and a record part of a non-relational database, and wherein the record part of the non-relational database includes at least a parent record part,
   wherein a single command processes the relational operation with the record part of the relational database as an object of operation to extract a predetermined set of records, and wherein the single command processes the data manipulation on the predetermined set of records.

8. A method as recited in claim 7, wherein said record part of the non-relational database includes the parent record part and at least one child record part linked to the parent record part.

* * * * *